United States Patent Office 3,177,244
Patented Apr. 6, 1965

3,177,244
FORMATION OF HIGH MOLECULAR WEIGHT COMPOUNDS
Louis Schmerling, Riverside, and Walter G. Toekelt, Downers Grove, Ill., assignors to Universal Oil Products Company, Des Plaines, Ill., a corporation of Delaware
No Drawing. Filed July 27, 1961, Ser. No. 127,130
8 Claims. (Cl. 260—515)

This application is a continuation-in-part of our copending application Serial No. 793,287, filed February 16, 1959, now abandoned.

This invention relates to a method for preparing organic compounds of relatively high molecular weight and particularly to a method of preparing relatively high molecular weight orgainc salts and the corresponding acids thereof. More particularly yet the invention is concerned with the preparation of alkali metal salts and alkaline earth metal salts of relatively high molecular weight organic compounds and also to the preparation of the acids thereof.

Relatively high molecular weight orgainc acids or the corresponding alkali metal salts and alkaline earth metal salts thereof find many uses in the chemical field. For example, the higher molecular weight organic acids are used as intermediates in the preparation of relatively high molecular weight organic esters which in turn are used in the preparation of artificial perfumes and flavors. Furthermore, certain esters may also be used as solvents, especially in the manufacture of quick drying paints and lacquers. In addition the alkali metal salts of the higher molecular weight carboxylic acids may be used in the preparation of soaps and cleansing agents.

It is therefore an object of this invention to provide a method for the formation of alkali metal and alkaline earth metal salts of higher molecular weight organic acids.

A further object of this invention is to provide a method for the preparation of alkali metal and alkaline earth metal salts of both higher molecular weight mono- and polycarboxylic acids and also a method of preparing the corresponding acids themselves.

Taken in its broadest aspect one embodiment of this invention resides in a process for the formation of a salt of a carboxylic acid which comprises reacting a compound having the generic formula:

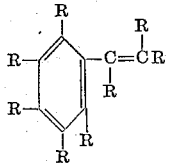

in which the R's are selected from the group consisting of hydrogen and alkyl radicals, with a compound selected from the group consisting of alkali metal salts and alkaline earth metal salts of saturated hydrocarbon carboxylic acids, said acids being characterized by the presence of at least one hydrogen atom on an alpha carbon atom, in the presence of an alkali metal catalyst at a temperature in the range of from about 50° to about 300° C., and recovering the desired salt of a carboxylic acid.

A further embodiment of this invention is found in a process for the formation of a salt of a carboxylic acid which comprises reacting a compound having the generic formula:

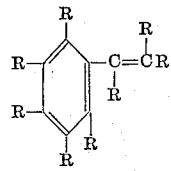

in which the R's are selected from the group consisting of hydrogen and alkyl radicals, with a compound selected from the group consisting of alkali metal salts of fatty acids, said acids being characterized by the presence of at least one hydrogen atom on an alpha carbon atom, in the presence of a catalyst selected from the group consisting of alkali metals, their hydrides, amides, alkyls and aryls at a temperature in the range of from about 50° to about 300° C., and recovering the desired salt of a carboxylic acid.

Yet another embodiment of this invention resides in a process for the formation of a carboxylic acid which comprises reacting a compound having the generic formula:

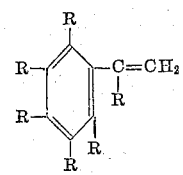

in which the R's are independently selected from the group consisting of hydrogen and alkyl radicals, with an alkali metal salt of a fatty acid, said acid being characterized by the presence of at least one hydrogen atom on an alpha carbon atoms, in the presence of a catalyst selected from the group consisting of alkali metals, their hydrides, amides, alkyls and aryls at a temperature in the range of from about 50° to about 300° C., to form a salt of a carboxylic acid, thereafter acidifying the resultant salt, and recovering the desired carboxylic acid.

A specific embodiment of this invention is found in a process for the formation of sodium 4-phenyl-2-methylbutyrate which comprises reacting styrene with sodium propionate in the presence of sodamide at a temperature in the range of from about 150° to about 250° C.

Another specific embodiment of this invention is found in a process for the formation of 4-phenyl-2-methylbutyric acid which comprises reacting styrene with sodium propionate in the presence of sodamide at a temperature in the range of from about 150° to about 250° C., and thereafter acidifying the resultant product.

Other objects and embodiments referring to alternative alkali metal salts of saturated carboxylic acids, alkaline earth metal salts of saturated carboxylic acids, and unsaturated side chain derivatives of aromatic hydrocarbons, catalysts and diluents will be found in the following further detailed description of the invention.

As hereinbefore stated this invention is concerned with the formation of alkali metal salts and alkaline earth metal salts of relatively high molecular weight organic acids and also to the preparation of these acids themselves. These compounds are prepared by reacting a compound having the generic formula:

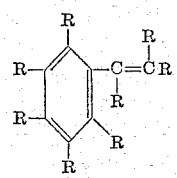

in which R is independently selected from the group consisting of hydrogen and alkyl radicals, preferably containing from 1 to about 4 carbon atoms, with either an alkali metal salt of a saturated carboxylic acid or an alkaline earth metal of a saturated carboxylic acid, said acid being characterized by the presence of at least one hydrogen atom on an α-carbon atom, in the presence of certain catalysts hereinafter set forth. The preferred unsaturated side chain derivatives of aromatic compounds which may be used in the process of this invention include styrene, α-methylstyrene, α-ethylstyrene, α-propylstyrene, α-butylstyrene, p-t-butyl-α-methylstyrene, etc. β-Alkylstyrenes and allylbenzenes may also be used but not necessarily with equivalent results.

The alkali metal salts or alkaline earth metal salts of saturated carboxylic acids which may be reacted with the olefinic compound hereinbefore set forth include those acids containing at least one hydrogen atom on a carbon atom alpha to a carboxy group, such a carbon atom being referred to as an α-carbon atom for the purposes of this specification and claims. Generic formulae which may be used to describe these acids are as follows:

and

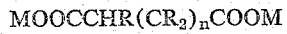

and

and

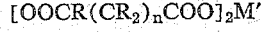

in which R is independently selected from the group consisting of hydrogen, alkyl, cycloalkyl and aryl radicals, M is an alkali metal, M′ is an alkaline earth metal and n is an integer of from 0 to about 10. Alkali metal salts or alkaline earth metal salts of acids falling within these generic formulae include (1) salts of the fatty acids such as sodium acetate, potassium acetate, lithium acetate, cesium acetate, rubidium acetate, calcium acetate, magnesium acetate, barium acetate, strontium acetate, sodium propionate, potassium propionate, lithium propionate, cesium propionate, rubidium propionate, calcium propionate, magnesium propionate, barium propionate, strontium propionate, sodium butyrate, potassium butyrate, lithium butyrate, cesium butyrate, rubidium butyrate, calcium butyrate, magnesium butyrate, barium butyrate, strontium butyrate, the aforementioned alkali metal and alkaline earth metal salts of valerates, hexanoates, heptanoates, octanoates, etc.; sodium cyclohexane carboxylate, potassium cyclohexanecarboxylate, lithium cyclohexanecarboxylate, cesium cyclohexanecarboxylate, magnesium cyclohexanecarboxylate, calcium cyclohexanecarboxylate, barium cyclohexanecarboxylate, strontium cyclohexanecarboxylate, sodium cyclohexylacetate, potassium cyclohexylacetate, lithium cyclohexylacetate, cesium cyclohexylacetate, magnesium cyclohexylacetate, calcium cyclohexylacetate, barium cyclohexylacetate, strontium cyclohexylacetate, sodium phenylacetate, potassium phenylacetate, lithium phenylacetate, rubidium phenylacetate, cesium phenylacetate, calcium phenylacetate, magnesium phenylacetate, barium phenylacetate, strontium phenylacetate, sodium 2- or 3-phenylpropionate, potassium 2- or 3-phenylpropionate, lithium 2- or 3-phenylpropionate, rubidium 2- or 3-phenylpropionate, cesium 2- or 3-phenylpropionate, calcium 2- or 3-phenylpropionate, magnesium 2- or 3-phenylpropionate, barium 2- or 3-phenylpropionate, strontium 2- or 3-phenylpropionate, the aforementioned alkali metal and alkaline earth metal salts of the phenylbutyrates, phenylvalerates, phenylhexanoates, etc.; and (2) salts of dicarboxylic acids such as sodium malonate, potassium malonate, lithium malonate, cesium malonate, rubidium malonate, calcium malonate, barium malonate, strontium malonate, sodium succinate, potassium succinate, lithium succinate, rubidium succinate, cesium succinate, calcium succinate, magnesium succinate, barium succinate, strontium succinate, sodium glutarate, potassium glutarate, lithium glutarate, rubidium glutarate, cesium glutarate, barium glutarate, calcium glutarate, strontium glutarate, the aforementioned alkali metal and alkaline earth metal adipates, pimelates, suberates, sebacates, etc. For purposes of this invention the aryl substituted monocarboxylic acids (as well as cycloalkyl substituted monocarboxylic acids) such as phenylacetic acid, 2- and 3-phenylpropionic acid, etc. (and cyclohexanecarboxylic acid, cyclohexylacetic acid, etc.), are considered as falling within the terms "saturated carboxylic acids." Due to the relatively greater availability and relatively lower cost as well as the greater yields which are obtained thereby the sodium and potassium salts of the aforementioned saturated carboxylic acids are the preferred reactants of the present process.

The catalysts which are employed in the present process are alkali metal catalysts, the term "alkali metal catalysts" being defined as the alkali metals per se and their derivatives which owe their activity to the ability to displace active or, as it may be so designated, acidic hydrogen from the starting materials; these include the alkali metals, their hydrides, amides, alkyls and aryls, and other organometallic compounds such as sodium, sodium hydride, sodamide, methylsodium, ethylsodium, butylsodium, phenylsodium, tolylsodium, xylylsodium, etc., potassium, potassium hydride, potassium amide, methylpotassium, ethylpotassium, butylpotassium, phenylpotassium, tolylpotassium, xylylpotassium, etc., lithium, lithium hydride, lithium amide, methyllithium, ethyllithium, butyllithium, phenyllithium, tolyllithium, xylyllithium, etc., rubidium, rubidium hydride, rubidium amide, methylrubidium, ethylrubidium, butylrubidium, phenylrubidium, tolylrubidium, xylylrubidium, etc., cesium, cesium hydride, cesium amide, methylcesium, ethylcesium, butylcesium, phenylcesium, tolylcesium, xylylcesium, etc. In addition mixed hydrides such as lithium aluminum hydride and sodium borohydride may also be used. The catalyst may also comprise an α-alkali metal derivative of an alkali metal or alkaline earth metal salt of a saturated carboxylic acid of the type hereinafter set forth (e.g., sodium sodioacetate) or a mixture of the derivative and one of the catalysts hereinbefore set forth. It is also contemplated within the scope of this invention that the alkali metal plus a promoter such as an aromatic hydrocarbon of the type including benzene, toluene, o-xylene, m-xylene, p-xylene, ethylbenzene, naphthalene, anthracene, etc., may also be used as catalysts for the present invention, although not necessarily with equivalent results.

In addition, if so desired, the reaction may be effected in the presence of a substantially inert organic diluent such as saturated aliphatic hydrocarbons including pentane, hexane, heptane, octane, etc.; cyclic and alkyl substituted cyclic hydrocarbons such as cyclopentane, cyclohexane, cycloheptane, etc., methylcyclopentane, methylcyclohexane, methylcycloheptane, etc.; aromatic hydrocarbons such as benzene, toluene, o-, m- and p-xylene, ethylbenzene, etc., may also be used but are usually less preferable inasmuch as they may not be completely inert under the reaction conditions. Tertiary alkyl and aryl amines such as tributylamine and N,N-dimethylaniline may also be employed as diluents as may alkyl and polyalkyl ethers such as dibutyl ethers, bis-(ethoxyethyl) ether, etc.

It is also contemplated within the scope of this invention that the aromatic compounds containing an unsaturated side chain of the type hereinbefore set forth may also be reacted with alkali metal or alkaline earth metal salts of saturated carboxylic acids in which a hydrogen atom attached to an α-carbon atom is replaced by an alkali metal or alkaline earth metal atom, such compounds including sodium α-sodioacetate, potassium α-potassioacetate, lithium α-lithioacetate, rubidium α-rubidioacetate, cesium α-cesioacetate, calcium α-calcioacetate, magnesium α-magnesioacetate, barium α-barioacetate, strontium α-strontioacetate, the aforementioned alkali metals and alkaline metal and alkaline earth metal organometallic derivatives of the alkali metal and alkaline earth metal salts of the propionates, butyrates, valereates, hexanoates, heptanoates, octanoates, etc.; cyclohexanecarboxylates, such as sodium α-sodiocyclohexanecarboxylate, potassium α - potassiocyclohexanecarboxylate, cesium α-cesiocyclohexanecarboxylate, magnesium α-magnesiocyclohexanecarboxylate, sodium α-sodiocyclohexylacetate, sodio α-sodiophenylacetate, magnesium α-magnesiophenylacetate, potassium α-potassio-β-phenylpropionate, the aforementioned alkali metal and alkaline earth metal phenylbutyrates, phenylvalerates, phenylhexanoates, etc.; dicarboxylic acids in which one or both α-carbon atoms are attached to an alkali metal or alkaline earth metal including the mono-substituted compounds such as sodium sodiomalonate, potassium potassiomalonate, calcium calciomalonate, strontium strontiomalonate, etc., sodium α-sodiosuccinate, lithium α-lithiosuccinate, barium α-bariosuccinate, etc.; di-α,α'-substituted compounds such as sodium α,α'-disodiosuccinate, potassium α,α' - dipotassiosuccinate, calcium α,α'-calciosuccinate, barium α,α'-bariosuccinate, etc.; and the aforementioned alkali metal and alkaline earth metal glutarates, adipates, pimelates, suberates, sebacates, etc. It is to be understood that these compounds may be reacted with the aromatic compound containing the unsaturated side chain although not necessarily with equivalent results.

Generally speaking the reaction between the alkali metal salt of a saturated carboxylic acid or the alkaline earth metal salt of a saturated carboxylic acid, said acids being chracterized by the presence of at least one hydrogen atom on an α-carbon atom, and the aromatic compound containing an unsaturated side chain, in the presence of a catalyst of the type hereinbefore set forth, is effected at a temperature in the range of from about 50° to about 300° C., and preferably at a temperature in the range of from about 150° to about 250° C., the particular temperature being dependent upon the reactants and the catalyst which are used. In addition the reaction may be carried out at an elevated pressure, in the range of from about 5 to about 200 atmospheres or more. This pressure may be the vapor pressure of the styrene compound and the diluent, if used, or it may be supplied by the introduction of an inert gas such as nitrogen into the reaction vessel, said pressure being sufficient to maintain a substantial portion of the reactants in liquid form.

The process of this invention may be effected in any suitable manner and may comprise either a batch or a continuous type operation. For example, when a batch type operation is used a quantity of the alkali metal salt of a saturated carboxylic acid or the alkaline earth metal salt of a saturated carboxylic acid along with the aromatic compound of the type hereinbefore set forth, along with the catalyst, and the diluent or solvent, if any is used, is sealed in a suitable apparatus such as, for example, a rotating autoclave. An inert gas may then be pressed in until the desired pressure has been reached. The reaction vessel is heated to the desired temperature and maintained thereat for a predetermined period of time after which the autoclave and contents thereof are cooled to room temperature, the excess pressure is vented and the reaction product is recovered by conventional means such as, for example, by dissolving the reaction product in water to hydrolyze any α-sodio salt and form an alkaline solution of the desired salt of a higher molecular weight organic acid. The aqueous solution may then be extracted with a suitable organic solvent such as ether to separate the diluent and to remove traces of alkali-insoluble material after which the resultant aqueous solution is concentrated and the desired salt is separated by fractional crystallization. Alternatively, if the higher molecular weight acid is the desired product the resultant aqueous solution is acidified with a mineral acid, such as hydrochloric acid, sulfuric acid, phosphoric acid, etc., and then recovered by extraction (followed by fractional distillation) or by steam-distillation or by crystallization, if solid.

The reaction process of the present invention may also be effected in a continuous type manner. In this type of operation the starting materials comprising the alkali metal or alkaline earth metal salt of a saturated carboxylic acid and the aromatic compound containing an unsaturated side chain are continuously charged to a reaction zone which is maintained at the proper operating conditions of temperature and pressure and which contains the desired catalyst such as the alkali metal or amide or hydride thereof. The salt of the saturated carboxylic acid and the aromatic compound, in either liquid or gaseous form, are charged to the reactor through separate lines or, if so desired, may be admixed prior to entry into said reactor and charged thereto in a single stream. Likewise, the solvent or diluent, if one is used, is also continuously charged to the reactor through separate means or, may be admixed with one or the other of the starting materials and charged thereto in a single stream. The reaction zone may comprise an unpacked vessel or coil or may be lined with an adsorbent packing material such as alumina, dehydrated bauxite, fire brick and the like mixed with the catalyst. A particularly applicable form of continuous operation for this reaction comprises a fixed bed form in which the reactants pass over a fixed bed of the catalysts in either an upward or downward flow. Other forms of continuous types of operation which may be used include the moving bed type in which the reactants and the catalyst pass either concurrently or countercurrently to each other in moving beds, and the slurry type in which the catalyst is carried into the reaction zone as a slurry in one of the reactants.

After a predetermined residence time has elapsed the reaction product is continuously withdrawn from the reactor and separated from diluent and unreacted styrene by conventional means. The unreacted starting materials are recycled to form a portion of the feed stock while the reaction product is then continuously charged to a second reaction zone where said product undergoes hydrolysis by treatment with water which is also being continuously charged to said second reactor. The resulting product is continuously withdrawn from the second reaction zone and the desired salt of the higher molecular weight organic acid is then separated by conventional means and recovered. If the higher molecular weight organic acid itself is desired, the aforesaid product from the second reaction zone is then continuously charged to yet a third reaction zone where it is acidified by the addition of an acid of the type hereinbefore set forth. The product is continuously withdrawn from this third reaction zone and the higher molecular weight organic acid is recovered by conventional means, such as, for example, fractional distillation, fractional crystallization, etc. Alternatively, the hydrolysis and acidification can be carried out simultaneously in the second zone.

The following examples are given to illustrate the process of the present invention which, however, are not intended to limit the generally broad scope of the present invention in strict accordance therewith.

*Example I*

A mixture of 30 g. of sodium propionate, 10 g. of sodamide and 30 g. of styrene was placed in a glass liner of a rotating autoclave having a capacity of 850 cc. The liner was sealed into the autoclave and nitrogen pressed in until an initial pressure of 30 atmospheres had been reached, said pressure being used to keep most of the styrene in the glass liner during the heating stage. The autoclave and contents thereof were then slowly heated at a temperature ranging from 150° to 250° C. for a period of about 4.5 hours. During this time the maximum pressure in the autoclave rose to 52 atmospheres. At the end of the aforementioned period of time the autoclave and contents thereof were cooled to room temperature, the final pressure at room temperature being 30 atmospheres. The excess pressure was vented, the autoclave was opened and 63 g. of a white to amber solid was recovered. This solid was treated with ice water and the resulting product was extracted with ether to remove alkali-insoluble material present. The aqueous layer was filtered to remove a small amount of powder, the desired sodium 4-phenyl-2-methylbutyrate being present in the filtrate from which it could be recovered by fractional crystallization if so desired.

The filtrate was acidified with hydrochloric acid and extracted with ether. The ether extract was then subjected to fractional distillation under reduced pressure, a cut boiling chiefly at 127–128° C. at 1.2 mm. being recovered. The neutral equivalent of this material was found to be 177; that calculated for 4-phenyl-2-methylbutyric acid is 178. The yield of the phenylmethylbutyric acid was 23% of the theoretical.

*Example II*

The condensation of sodium propionate with styrene was also carried out in a turbomixer, an autoclave equipped with an efficient stirrer, the styrene being added gradually to the heated mixture of sodium propionate and catalyst. A mixture of 50 g. of sodium propionate, 10 g. sodamide, and 150 g. benzene was sealed into the turbomixer pot which was then heated to 200° C. at which temperature the pressure on the autoclave was 250 p.s.i. Addition of a solution of 50 g. styrene in 50 g. benzene was begun. All of the solution was added during 2.3 hours during which the temperature was kept at 200–230° C. and the pressure was at 250–350 p.s.i. The mixture was stirred for an additional 1.5 hours after which the stirring was stopped and the pot was permitted to cool to room temperature. The product was worked up in the usual manner. Distillation of the ether extract of the acidified solution yielded 24 g. (26% yield) of 4-phenyl-2-methylbutyric acid boiling chiefly at 124–126° C. at 0.8 to 1.7 mm. pressure. The residue crystallized on standing. There was recovered about 4 g. of compound melting at 92° C., 2,2-bis-(2-phenylethyl)propionic acid.

*Example III*

A mixture of 30 g. of sodium propionate along with 10 g. of sodamide and 30 g. of α-methylstyrene was placed in a glass liner of a rotating autoclave having a capacity of 850 cc. The liner was sealed into the autoclave which was then heated at a temperature ranging from 150° to 250° C. during a period of about 4.5 hours. The reaction was effected under 30 atmospheres of initial nitrogen pressure in order to maintain a major portion of the α-methylstyrene in the liquid phase inside the glass liner. At the end of the aforementioned residence time, the autoclave and contents thereof were cooled to room temperature, the excess pressure was vented and the autoclave was opened. The solid reaction product was treated with ice water and extracted with ether to remove any alkali-insoluble material which may have been present.

The aqueous solution which contains unreacted sodium propionate may be subjected to fractional crystallization to separate the desired sodium salt of the 4-phenyl-2-methylvalerate. Preferably, however, the aqueous solution is acidified using mineral acid as the acidifying agent. Acidification with hydrochloric acid followed by extraction with ether and fractional distillation of the extract under reduced pressure yielded the 4-phenyl-2-methylvaleric acid (boiling at about 125–135° C. at 1.0 mm.) in 18% yield. The material crystallized on standing; melting point, about 78° C.

*Example IV*

This experiment was carried out under the same conditions as Example III except that an excess of α-methylstyrene was employed together with benzene as diluent. A mixture of 50 g. of sodium propionate, 100 g. of α-methylstyrene, 50 g. of benzene, and 10 g. of sodamide in a glass liner was sealed into the rotating autoclave and nitrogen was charged to 30 atmospheres initial pressure. The autoclave was heated at 150–250° C. for 4.8 hours after which the product was worked up in the manner described in Example III. Distillation of the ether extract of the acidified product yielded 35 g. (35% of the theoretical) or 4-phenyl-2-methylvaleric acid boiling at about 125–130° C. at 0.9 mm. pressure.

*Example V*

A mixture of 30 g. of sodium butyrate, 30 g. of styrene along with a catalyst comprising 3 g. of sodium metal and 1 g. of anthracene is placed in a glass liner of a rotating autoclave. The liner is sealed into the autoclave and nitrogen pressed in until an initial pressure of 30 atmospheres has been reached. The autoclave and contents thereof are then slowly heated to a maximum temperature of about 250° C. during a period of about 4.5 hours. At the end of the desired residence time the autoclave and contents thereof are cooled to room temperature, the excess pressure is vented, the autoclave is opened and the solid reaction product is recovered. This product is then treated with ice water and the water solution is extracted with ether to remove any alkali-insoluble material which may be present. The desired product comprising sodium 4-phenyl-2-ethylbutyrate may be recovered and separated from any unreacted starting materials and/or side products by conventional means such as fractional crystallization.

Preferably, however, the solution is acidified using hydrochloric acid as the acidifying agent. Following this, the thus liberated carboxylic acids are extracted with ether and the ether extract subjected to fractional distillation under reduced pressure, the desired 4-phenyl-2-ethylbutyric acid being separated and recovered.

*Example VI*

When potassium acetate is treated with α-methylstyrene in the presence of sodium hydride under the conditions of Example II, there is obtained 4-phenylvaleric acid.

*Example VII*

In this experiment a mixture of 50 g. of sodium propionate, 10 g. of butyllithium and 150 g. on n-heptane is sealed into a turbomixer pot which is then heated to a temperature of about 200° C. A solution of 50 g. of styrene in 50 g. of n-heptane is slowly added to the pot accompanied by vigorous stirring. The solution is added during a period of about 2.5 hours during which time the temperature is maintained in a range of from about 200° to about 225° C. The mixture is stirred for an additional 1.5 hours after which the stirring is stopped and the pot is permitted to cool to room temperature. The product is worked up in a manner similar to that set forth in Example I, distillation of the ether extract of the acidified solution yielding 4-phenyl-2-methylbutyric acid which boils at about 124–126° C. at a pressure of about 1 mm. of mercury. The residue which crystallizes upon standing contains 2,2-bis-(2-phenylethyl)propionic acid which melts at about 92° C.

*Example VIII*

A mixture of 30 g. of sodium propionate, 10 g. of potassium and 30 g. of propenylbenzene is placed in the glass liner of a rotating autoclave. The liner is sealed into the autoclave and nitrogen is pressed in until an initial pressure of 30 atmospheres is reached. The autoclave and contents thereof are then slowly heated at a temperature ranging from about 150° to about 250° C. for a period of about 4.5 hours. At the end of the desired residence time the autoclave and contents thereof are cooled to room temperature. The excess pressure is vented and the reaction product is recovered. The potassium salts are then acidified with hydrochloric acid and extracted with ether, the desired product comprising a mixture of 2,3-dimethyl-4-phenylbutyric acid and 2-methyl-3-phenylvaleric acid is recovered.

We claim as our invention:

1. A process for the formation of a salt of a carboxylic acid which comprises reacting a compound selected from the group consisting of styrene and alpha-alkylstyrenes having alkyl radicals of from 1 to about 4 carbon atoms with a compound selected from the group consisting of alkali metal salts and alkaline earth metal salts of saturated hydrocarbon carboxylic acids, said salts being characterized by the presence of at least one hydrogen atom on an alpha carbon atom, in the presence of a catalyst selected from the group consisting of alkali metals, their hydrides, amides, alkyls and aryls at a temperature in the range of from about 50° to about 300° C., and recovering the desired salt of a carboxylic acid.

2. A process for the formation of a salt of a carboxylic acid which comprises reacting a compound selected from the group consisting of styrene and alpha-alkylstyrenes having alkyl radicals of from 1 to about 4 carbon atoms with an alkali metal salt of a fatty acid characterized by the presence of at least one hydrogen atom on an alpha carbon atom, in the presence of a catalyst selected from the group consisting of alkali metals, their hydrides, amides, alkyls and aryls at a temperature in the range of from about 50° to about 300° C., and recovering the desired salt of a carboxylic acid.

3. A process for the formation of a salt of a carboxylic acid which comprises reacting a compound selected from the group consisting of styrene and alpha-alkylstyrenes having alkyl radicals of from 1 to about 4 carbon atoms with an alkali metal salt of a fatty acid characterized by the presence of at least one hydrogen atom on an alpha carbon atom, in the presence of sodamide at a temperature in the range of from about 50° to about 300° C., and recovering the desired salt of a carboxylic acid.

4. A process for the formation of a salt of a carboxylic acid which comprises reacting a compound selected from the group consisting of styrene and alpha-alkylstyrenes having alkyl radicals of from 1 to about 4 carbon atoms with an alkali metal salt of a fatty acid characterized by the presence of at least one hydrogen atom on an alpha carbon atom, in the presence of sodium at a temperature in the range of from about 50° to about 300° C., and recovering the desired salt of a carboxylic acid.

5. A process for the formation of sodium 4-phenyl-2-methylbutyrate which comprises reacting styrene with sodium propionate in the presence of sodamide at a temperature in the range of from about 150° to about 250° C.

6. A process for the formation of sodium 4-phenyl-2-methylvalerate which comprises reacting alpha-methylstyrene with sodium propionate in the presence of sodamide at a temperature in the range of from about 150° to about 250° C.

7. A process for the formation of sodium 4-phenyl-2-ethylbutyrate which comprises reacting styrene with sodium butyrate in the presence of sodium at a temperature in the range of from about 150° to about 250° C.

8. A process for the formation of potassium 4-phenylbutyrate which comprises reacting styrene with potassium acetate in the presence of sodium hydride at a temperature in the range of from about 150° to about 250° C.

References Cited by the Examiner

UNITED STATES PATENTS 2,948,724  8/60  Sahyun et al. _____ 260—515

FOREIGN PATENTS 1,030,326  5/58  Germany.

LEON ZITVER, *Primary Examiner.*

CHARLES B. PARKER, *Examiner.*